United States Patent
Reinke et al.

[11] Patent Number: 5,493,650
[45] Date of Patent: Feb. 20, 1996

[54] APPARATUS AND METHOD FOR MONITORING THE PRESENCE OF CABLES CONNECTED TO PORTS OF A COMPUTER NETWORK CONTROLLER AND AUTOMATICALLY RECONFIGURING THE NETWORK WHEN CABLES ARE CONNECTED TO OR REMOVED FROM THE CONTROLLER

[75] Inventors: Karl Reinke, Santa Clara; Robert W. Smith, Los Altos, both of Calif.

[73] Assignee: SynOptics Communications, Inc., Santa Clara, Calif.

[21] Appl. No.: 205,181

[22] Filed: Mar. 2, 1994

[51] Int. Cl.⁶ ............................................ G06F 13/36
[52] U.S. Cl. .................. 395/200.12; 395/182.02; 364/DIG. 1; 364/DIG. 2
[58] Field of Search ........................... 395/200, 575; 375/36; 350/56, 85.5; 324/520

[56] References Cited

U.S. PATENT DOCUMENTS

| | | | |
|---|---|---|---|
| 3,749,857 | 7/1973 | König | 324/539 |
| 4,023,154 | 5/1977 | Comeaux | 324/256 |
| 4,506,210 | 3/1985 | Chase | 324/66 |
| 4,670,709 | 6/1987 | Iredale | 324/542 |
| 4,812,752 | 3/1989 | Preuss | 324/542 |
| 5,053,910 | 10/1991 | Goldstein | 361/111 |
| 5,170,113 | 12/1992 | Albonesi | 324/66 |
| 5,339,022 | 8/1994 | Fleming et al. | 324/67 |
| 5,365,513 | 11/1994 | Copley et al. | 370/17 |
| 5,365,515 | 11/1994 | Graham | 370/17 |

*Primary Examiner*—Parshotam S. Lall
*Assistant Examiner*—Zarni Maung
*Attorney, Agent, or Firm*—Blakely, Sokoloff, Taylor & Zafman

[57] ABSTRACT

An apparatus for monitoring whether a cable is coupled to a port of a computer network. A free-running oscillator is initially set to a base frequency when a cable is not coupled to the port. If a cable is subsequently coupled to that port, the inherent capacitance of that cable loads one of the nodes associated with the oscillator. The result of this capacitance is that the oscillator is now running at a lower frequency. A frequency counter and threshold comparator are used to detect whether the oscillator frequency has fallen below a pre-determined frequency threshold. If the oscillator frequency has not fallen below this threshold, the port is not included in the network path. However, if the oscillator frequency has fallen below the threshold, this indicates that a cable has been coupled to the port. Consequently, the trunk port is inserted into the computer network's path.

33 Claims, 5 Drawing Sheets

APPARATUS AND METHOD FOR MONITORING THE PRESENCE OF CABLES CONNECTED TO PORTS OF A COMPUTER NETWORK CONTROLLER AND AUTOMATICALLY RECONFIGURING THE NETWORK WHEN CABLES ARE CONNECTED TO OR REMOVED FROM THE CONTROLLER

FIELD OF THE INVENTION

The present invention pertains to the field of computer networks. More specifically, the present invention relates to an apparatus and method for monitoring the presence of cables connected to the ports of a computer network.

BACKGROUND OF THE INVENTION

In the history of computer systems, highly centralized mainframe computers initially dominated the industry. The mainframes later lead the way to the less expensive and more versatile minicomputers. With the advent of the personal computers, computing power was distributed to end users at the desktop. This paved the way for the powerful and high-speed workstations. Ultimately, these personal computers and workstations were connected together in order to allow the end users to share files, applications, and peripheral hardware (e.g. printers, storage devices such as disk drives, etc.). Thereby, individuals and work groups could share information and expensive computing resources while increasing the reliability of the computer system. This type of arrangement came to be known as Local Area Networks (LANs).

Basically, a LAN is comprised of a number of data terminals or data terminal equipment (DTE) which are coupled to transmission lines (i.e. circuits, channels, or trunks) through transceivers. A DTE is an individual device such as a personal computer, a workstation, a mainframe computer, a dumb or intelligent terminal, etc. A transceiver couples a DTE to a transmission line and performs any necessary signal conversions. The transmission lines conduct bits of data between the interconnected DTEs. Often, a concentrator (i.e. an intelligent hub or a hub) is used to route and manage traffic on the network.

Various network configurations (topologies) evolved. Some of the more popular configurations include the star, ring, tree, and bus topologies. In addition, various protocols for these networks also evolved. The most widely used protocols include the token bus, token ring, and Carrier Sense Multiple Access with Collision Detection (CSMA/CD) which is sometimes referred to as Ethernet.

Because of the numerous advantages offered by LANs, their numbers and sizes increased. Eventually, individual LANs were interconnected to form expansive, enterprise-wide networks. A collection of computer network entities came to be known as a domain. Repeaters were used to copy and forward bits of data from one network to another, simulating one large network from the combination of two or more separate but similar networks. In cases wherein networks had different protocols (e.g. Ethernet vs. Token Bus), bridges were implemented as an interface so that these networks could become interconnected. Bridges are smart, software-intensive devices. Bridges can be programmed to listen to all network traffic, examine each data packer's destination, and selectively forward each data packet while making any necessary changes. For interconnecting two different networks (e.g. Token Bus vs. X.25), a router is used. Routers also have the capability of directing data packets to their final destination by the least costly available path. Other devices and circuits have been implemented so that various LANs having different cabling schemes, access methods, protocols, operating systems, applications and computing devices can all be interconnected to form one vast network system.

When users wish to interconnect together two or more hitherto independent computer networks, it would be convenient if the interface could be performed automatically by the computer network. All the user would be required to do is to simply physically connect the cables to the proper network ports. The rest of the interfacing would be handled internal to the computer network and transparent to the user.

In the past, a wheatstone-bridge based implementation was used to detect the presence of whether a cable was connected to a particular port. However, this implementation required a 12 volt power supply. In some applications, a 12 volt power supply is not readily available. Furthermore, this wheatstone-bridge approach requires the use of special customized magnetics, which is relatively expensive.

Another prior art approach for detecting the presence of a cable connected to a port involves the use of a phantom signaling scheme. In this scheme, one of the concentrators sends out a predetermined "phantom" signal out of that port. If that port happens to be in use, a reply signal will be generated as an acknowledgment to the sent phantom signal. This scheme works fine so long as all of the concentrators belonging to that network recognize and support the same phantom signaling scheme. If a user wishes to interconnect computer networks having concentrators manufactured by different vendors, one of the concentrators might have an incompatible phantom signaling scheme or might not even have the a phantom signaling capability.

Thus, there is a need in the prior art for an inexpensive, efficient, and reliable mechanism for monitoring the presence of cables connected to ports of a computer network. Such a mechanism must be non-intrusive and cannot interfere with the operation of equipment connected to those ports.

SUMMARY OF THE INVENTION

The present invention pertains to an apparatus and method for monitoring whether a cable is coupled to a port of a computer network. A free-running oscillator is initially set to a base frequency when a cable is not coupled to the port. If a cable is subsequently coupled to that port, the inherent capacitance of that cable loads one of the nodes associated with the oscillator. The result of this capacitance is that the oscillator is now running at a lower frequency. A frequency counter measures the oscillator frequency. A comparator is used to determine whether the oscillator frequency has fallen below a pre-determined frequency threshold. If the oscillator frequency has not fallen below this threshold, the network's micro-controller does not include this port in the network path. However, if the oscillator frequency has fallen below the threshold, this indicates that a cable has been coupled to the port. Consequently, the micro-controller inserts the trunk port into the computer network's path.

In the currently preferred embodiment, an ECL oscillator (e.g., a line receiver) is used in conjunction with a frequency counter/threshold comparator device to provide the cable detection. The oscillator is set up so that its frequency without a cable present is above the threshold frequency of the frequency counter/threshold comparator device. The capacitance of a cable plugged into the port lowers the frequency of the oscillator. Cables seven feet long or longer lowers the frequency of the oscillator below the threshold frequency of the frequency counter/threshold comparator device. The threshold comparator reports this change to the on-board logic. Thereby, the on-board logic can take appropriate action to either insert or bypass that port.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for monitoring the presence of cables connected to ports of a computer network is described. In the following description, for purposes of explanation, numerous specific details are set forth, such as frequencies, protocols, resistances, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Figure 1:
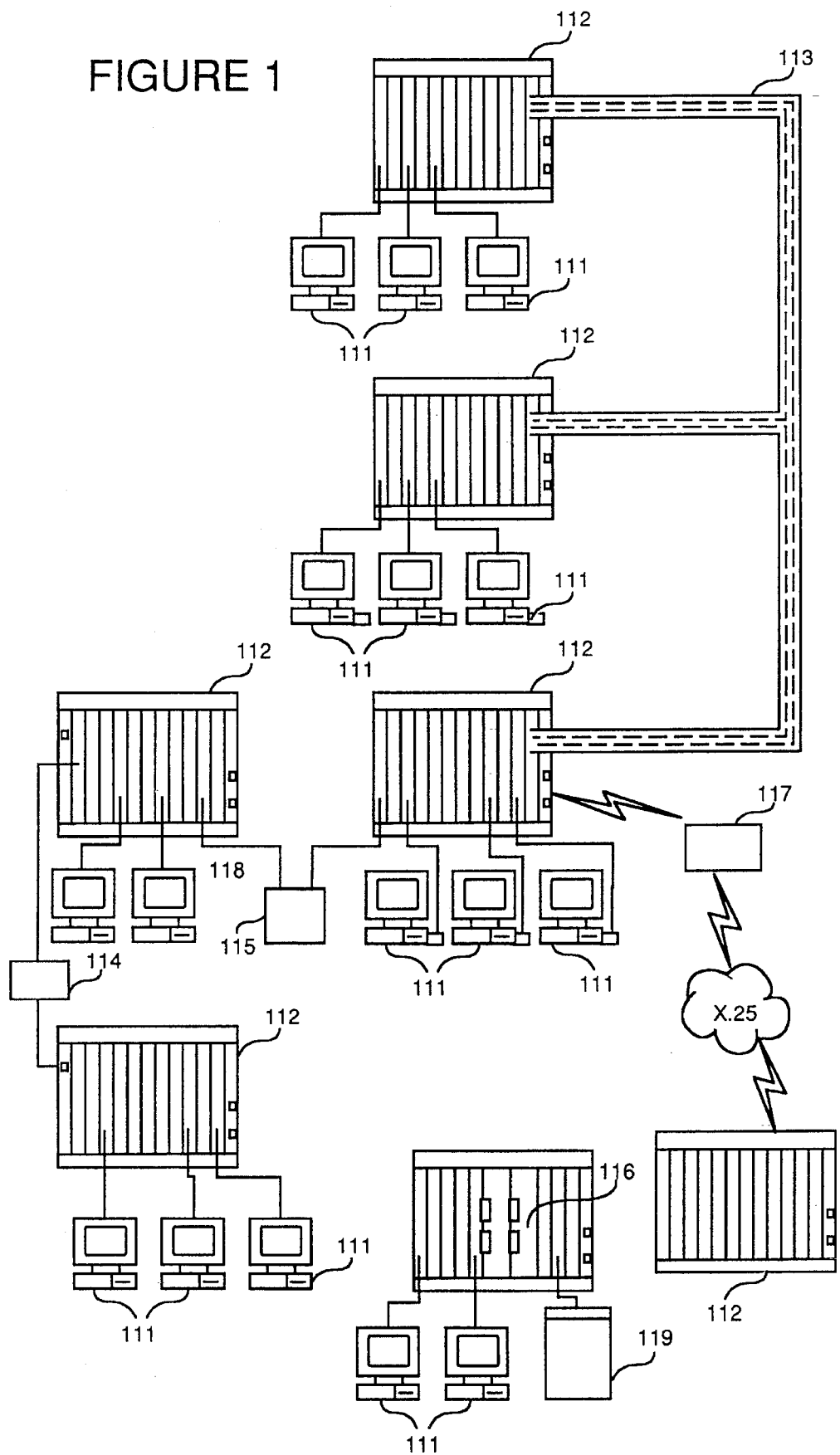
FIG. 1 shows a computer network system upon which the present invention may be practiced.

Referring to FIG. 1, a computer network system upon which the present invention may be practiced is shown. A number of users access the network via data terminal equipment (DTE) 111 which can be a personal computer, a workstation, a dumb terminal, etc. The DTE 111 are coupled to concentrators 112 by means of cables. These cables can include unshielded twisted pair cables, shielded twisted pair cables, coaxial cables and fiber optic cables. Concentrators 112 act as focal points for managing and routing network data transmissions. A number of concentrators can be intercoupled by means of a fiber optic cable 113, shielded twisted pair cable, or unshielded twisted pair cable. When two network segments are coupled by a long cable run, the signals become attenuated. Hence, a repeater 114 is used to amplify the signals.

A bridge 115 can be used to couple two concentrators which service network segments having differing protocols (e.g. an Ethernet-to-Token Ring bridge). Bridge 115 listens to data transmissions, examines each data packet's destination, makes any necessary, conversions, and discriminately forwards each data packet. A remote bridge 116 allows the coupling of geographically dispersed network segments through a variety of serial links. A router 117 is used to interface and couple two networks having differing network layers (e.g. Token Bus vs. X.25). A router also has the capability of directing data packets to their final destination by the least costly available path. By adding a file server 119 to the network, users are able to share stored files and applications.

The computer network of FIG. 1 can be greatly expanded to accommodate several hundred users by adding more DTEs 111, concentrators 112, repeaters 114, bridges 115, and routers 117. These devices may be added on an as needed basis. Various parts of the network can be configured any number of ways to suit the needs of the users (e.g., star, ring, tree, etc.). Furthermore, various parts of the network can employ different protocols such as Ethernet, token ring, token bus, etc. It should be noted that the present invention can be applied to virtually any type of computer network configuration.

Figure 2:
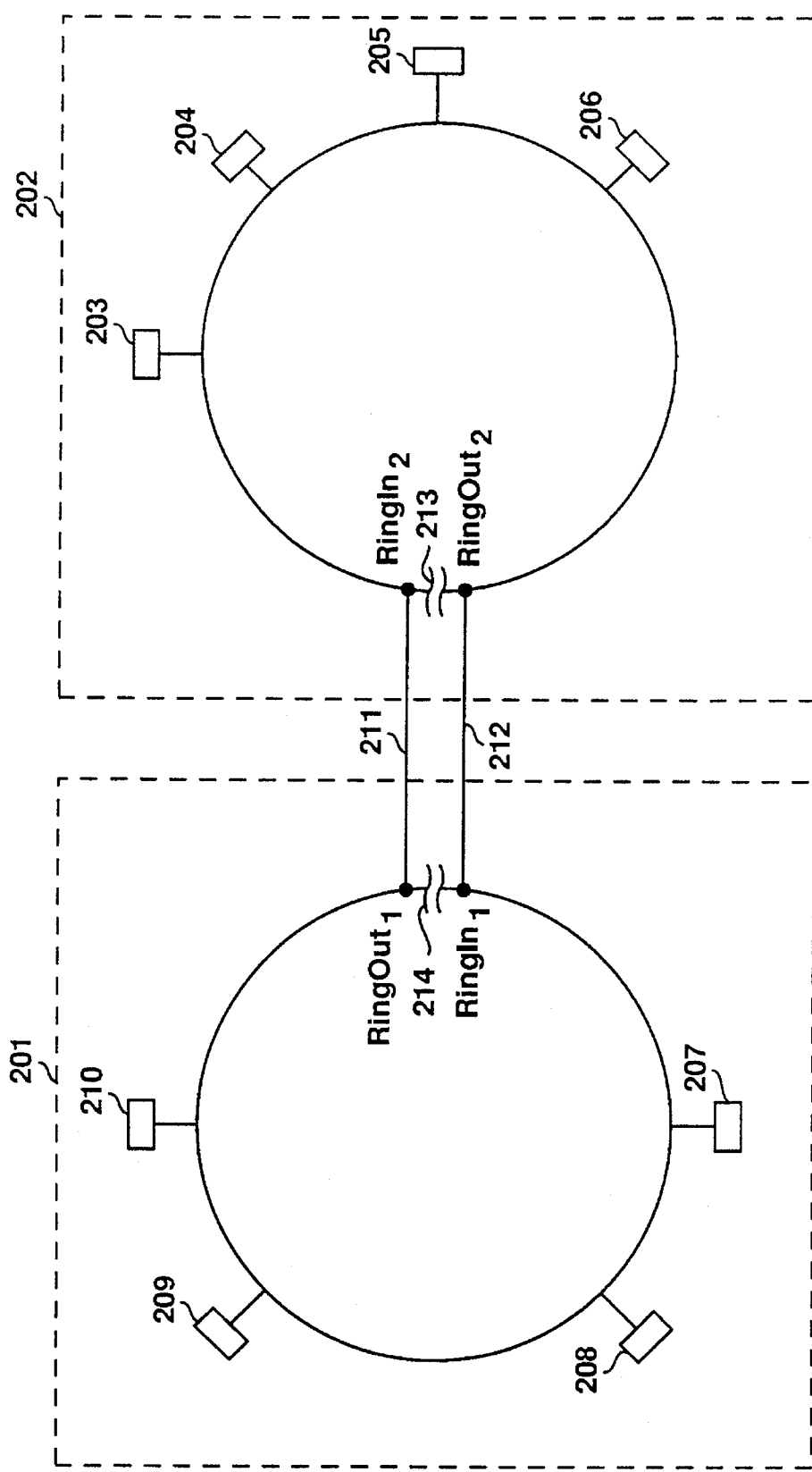
FIG. 2 shows an example of two interconnected token ring networks.

FIG. 2 shows an example of two interconnected token ring networks 201 and 202. Token rings 201 and 202 are comprised of a logical ring configured in a physical star. A number of devices (e.g., DTE, concentrators, etc.) 203–206 are coupled to token ring 202, and devices 207–210 are coupled to token ring 201. In order to interconnect token ring 201 to token ring 202, two cables 211 and 212 are used. One end of cable 211 is inserted in the RingIn$_1$ port of token ring 201, while the other end is inserted to the RingOut$_2$ port of token ring 202. Likewise, one end of cable 212 is inserted in the RingOut$_1$ port of token ring 201, while the other end is inserted in the RingIn$_2$ port of token ring 202. Hence, the RingOut$_2$ port of token ring 201 is connected to the RingIn$_1$ port of token ring 202, and the RingOut$_1$ port of token ring 201 is connected to the RingIn$_2$ port of token ring 202. In addition, token ring 201 is open circuited at 214, and token ring 202 is open circuited at 213.

Cables 211 and 212 can be shielded twisted pair wiring or unshielded twisted pair wiring. By thusly connecting cables 211–212 and making the open circuits 213–214, token rings 201 and 202 are interconnected to form one single, larger token ring network. The presence of cables 211 and 212 inserted in the RingIn and RingOut ports is detected according to the circuit as described below.

Figure 3:
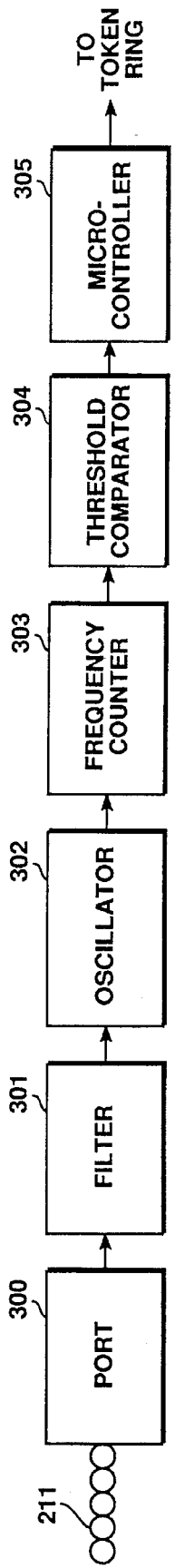
FIG. 3 shows a block diagram of a circuit for detecting the presence of a cable when inserted into a port of a computer network.

FIG. 3 shows a block diagram of a circuit for detecting the presence of a cable when inserted into a port of a computer network. Initially, the user inserts or otherwise couples cable 211 to port 300. A filter 301 is used to filter out-going signals. However, filter 301 is designed to operate only on differential mode signals rather than common-mode signals. Hence, filter 301 does not impact the present invention for detecting the presence of cable 211. An oscillator 302 is coupled to filter 301. The operating frequency of oscillator 302 is dependent on the capacitance at a particular node. Cable 211 has an inherent capacitance corresponding to its length. By loading that particular node with the inherent capacitance of cable 211, the operating frequency of oscillator 302 is effected. In other words, when cable 211 is not coupled to port 300, oscillator 302 outputs a signal at one frequency. Conversely, when cable 211 is coupled to port 300, oscillator 302 outputs a signal at a different frequency.

The signal generated by oscillator 302 is input to frequency counter 303. Frequency counter 303 determines the frequency of the signal output from oscillator 302. This frequency is compared against a pre-determined threshold by threshold comparator 304. The threshold is chosen so as to differentiate between the different oscillator frequencies which are generated, depending upon whether cable 211 is coupled to port 300. In other words, if cable 211 is not coupled to port 300, oscillator 302 is designed to output a certain frequency that exceeds the threshold. Consequently, threshold comparator 304 outputs a signal to micro-controller 305 to indicate this condition. If cable 211 happens to be connected to port 300, the capacitance inherent to cable 211 causes oscillator 302 to output a different frequency. This different frequency falls below the threshold. This condition is indicated by the signal generated by threshold comparator 304. Hence, the signal from threshold comparator 304 indicates whether or not there is a cable coupled to port 300. Based on the signal generated by threshold comparator 304, micro-controller 305 can correctly determine whether to insert the trunk port 300 into the token ring path. Note that if there is a cable connected to a port, it is assumed that the trunk is in use, and the trunk is inserted as part of the token ring.

Figure 4:
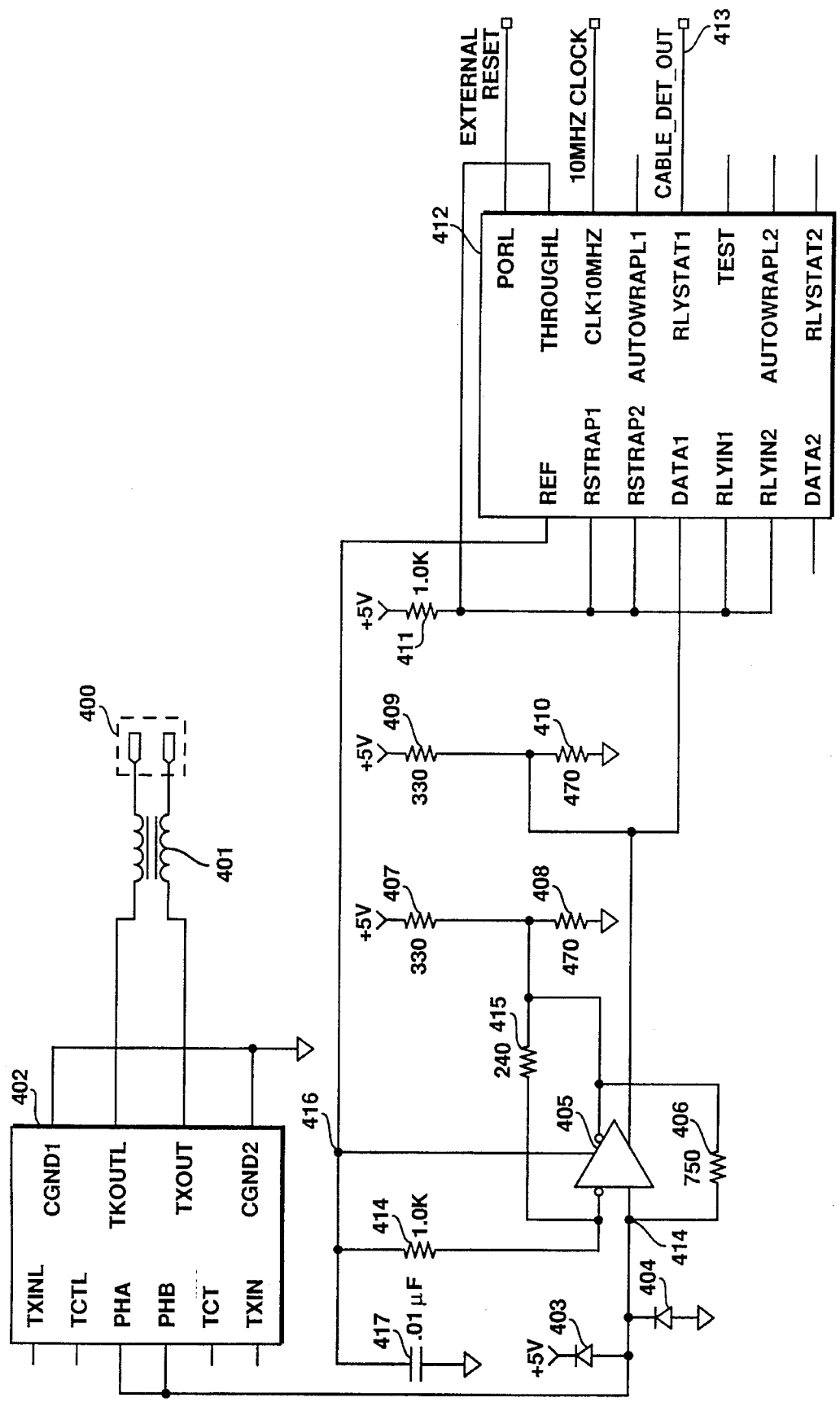
FIG. 4 shows a detailed circuit diagram of the currently preferred embodiment for monitoring the presence of a cable on a trunk port.

FIG. 4 shows a detailed circuit diagram of the currently preferred embodiment for monitoring the presence of a cable on a trunk port. The cable is to be inserted to port 400. A common mode choke 401 is used to provide common mode roll-off for the outgoing signal. The output signal is filtered by filter 402. Note that filter 402 only affects the outgoing differential-mode signals and does not affect the cable detection circuit of the present invention. Diodes 403 and 404 are used to provide for surge protection.

An emitter-coupled logic (ECL) line receiver 405 is configured to operate as a free-running oscillator. Line receiver 405 can be a 10116T ECL line receiver as manufactured by Motorola of Schaumberg, Ill. Feedback resistor 406 determines the base frequency at which the oscillator is running. In the currently preferred embodiment, resistor 406 is 750 ohms, which results in a base frequency of approximately 1.4 MHz. Feedback resistor 406 can be adjusted so the base frequency will remain at approximately 1.4 MHz if a different filter is used. Coupling a cable to port 400 causes node 414 to be loaded with that cable's inherent capacitance.

A Type 1 shielded twisted pair (STP) cable will typically exhibit approximately 2 picofarads of capacitance per foot. Hence, even a relative short cable length will dramatically change the oscillator's frequency. For example, coupling a 3.5 foot cable causes the oscillator's frequency to fall from its base frequency of 1.4 MHz to approximately 1.15 MHz. In the currently preferred embodiment, a minimum cable length of 7 feet is specified. Insertion of a 7 foot cable will cause the oscillator frequency to drop to approximately 800 kHz. Unshielded twisted pair (UTP) cable may also be used.

The oscillator's frequency is continuously monitored by the rate detector chip 412. The currently preferred embodiment of the present invention utilizes an already existing component (i.e., rate detector chip 412) to also perform the function of monitoring whether the oscillator's frequency falls below a certain threshold. Normally, the rate detector chip 412 is used in token ring ports to verify the validity of incoming signals. A received signal is a valid token ring signal if it falls within a specified frequency range. For a 4 Mbit signal, the frequency ranges from 1.2–4 MHz; for a 16 Mbit signal, the frequency ranges from 5.2–16 MHz. The rate detector chip 412 is basically a frequency counter with a threshold comparator.

Instead of adding separate, dedicated components to monitor the oscillator's frequency, the currently preferred embodiment leverages off of the already existing rate detector chip 412 to provide the dual functions of validating incoming signals and monitoring the oscillator's frequency. In the currently preferred embodiment, if the oscillator's frequency exceeds 1.2 MHz, rate detector chip 412 outputs a "high" signal on the cable detect output line 413. This indicates that the presence of a cable is not detected on port 400. In response, the micro-controller does not insert port 400 as part of the token ring. However, if the oscillator's frequency equals to or falls below 1.2 MHz, data rate detector 412 outputs a "low" signal on cable detect output line 413. In response, the micro-controller inserts port 400 into the token ring.

Resistors 414 and 415 are used to provide hysteresis for oscillator line receiver 405. Resistors 407–410 are used as line terminators for the ECL line receiver 405. Line 416 provides the biasing voltage for ECL line receiver 405. Line 416 also provides a referencing voltage for rate detector chip 412. Capacitor 417 provides decoupling for the ECL line receiver 405. Resistor 411 is used as a pull-up for rate detector 412. Furthermore, an external reset as well as a 10 MHz clock signal are provided to rate detector 412.

In summary, an oscillator (e.g., ECL line receiver 405) is used in conjunction with a frequency counter and threshold comparator (e.g., rate detector chip 412) to provide the cable detection. The oscillator is set up so that its frequency without a cable present is above the threshold frequency of the threshold comparator. The capacitance of a cable plugged into the port lowers the frequency of the oscillator. Cables seven feet long or longer, lowers the frequency below the threshold frequency of the threshold comparator. It reports this change to the on-board logic. Since the clock waveform generated by the oscillator is a common-mode signal, it does not effect the token ring differential mode data signal and does not cause electromagnetic interference (EMI) emissions problems, since common-mode filters are part of the existing circuit. Although the above discussion is in reference to token rings, it should be noted that the present invention applies equally to other types of topologies and protocols as well. It should further be noted that the above-described circuit can be duplicated to monitor each port of a computer network.

Figure 5:
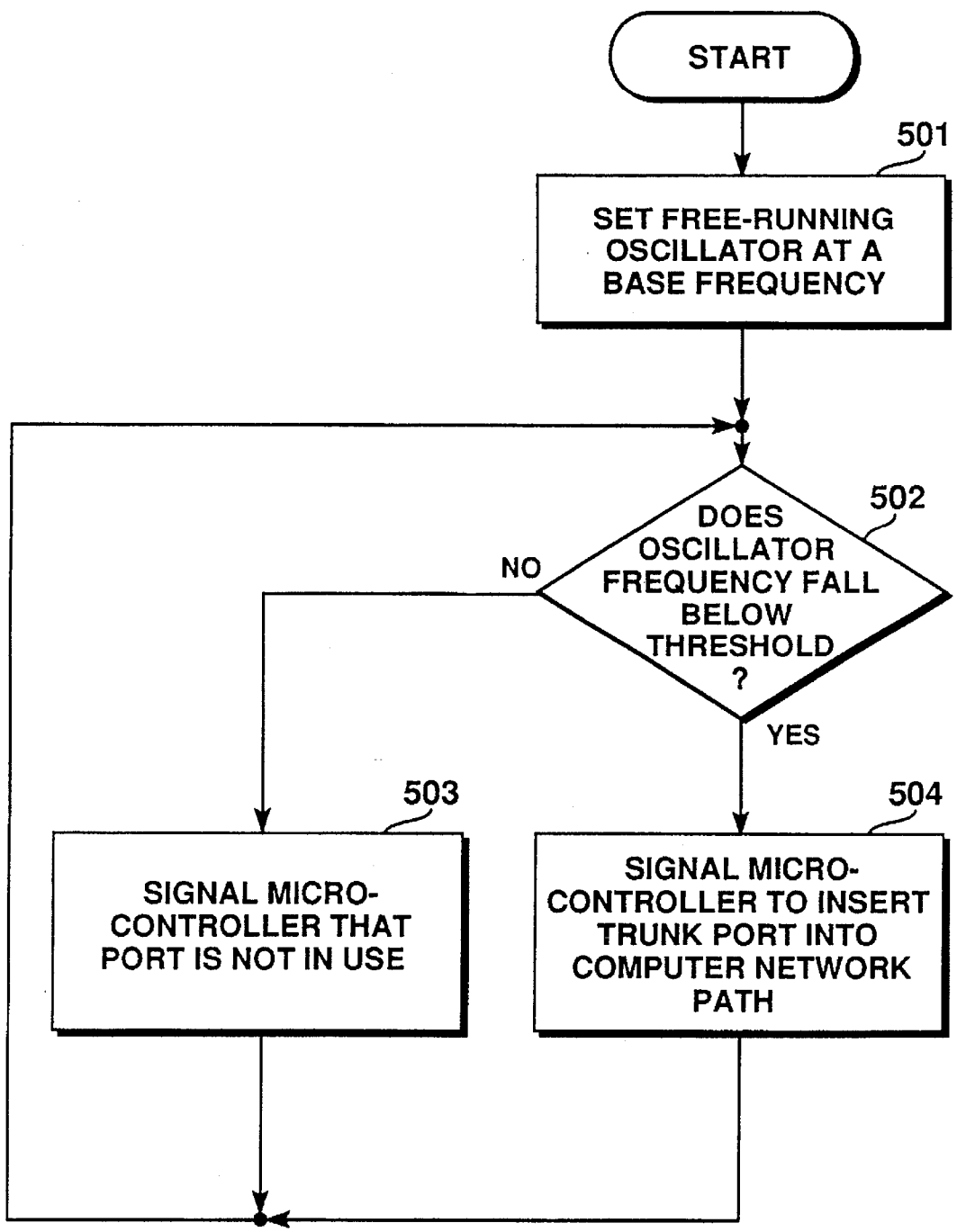
FIG. 5 is a flowchart describing the steps for detecting the presence of a cable in a port of a computer network.

FIG. 5 is a flowchart describing the steps for detecting the presence of a cable in a port of a computer network. Initially, a free-running oscillator is set to a base frequency, step 501. A determination is made as to whether the frequency of the oscillator falls below a pre-determined threshold, step 502. If the oscillator frequency does not fall below the threshold, the computer network's micro-controller is signaled that the trunk port is not in use, step 503. If the oscillator frequency does fall below the threshold, the micro-controller is signaled to insert that trunk port into the network path, step 504. Note that step 502 is periodically performed to sample the oscillator frequency.

Thus, an apparatus and method for monitoring the presence of cables connected to the ports of a computer network is disclosed.

What is claimed is:

1. In a computer network, a method for determining whether a cable is coupled to a port of said computer network, said method comprising the steps of:

setting an oscillator to output a first signal at a first frequency;

said oscillator outputting said first signal at a second frequency if said port is loaded with a capacitance from said cable;

a comparison circuit comparing said first signal output from said oscillator to a comparison value and generating a second signal responsive to whether said first signal compares to said comparison value;

inserting said port in a path of said computer network according to said second signal.

2. The method of claim 1, wherein said first frequency is approximately 1.4 MHz.

3. The method of claim 2, wherein said threshold is set at approximately 1.2 MHz.

4. The method of claim 1 further comprising the step of providing surge protection for said oscillator.

5. The method of claim 1 further comprising the step of providing hysteresis for said oscillator.

6. An apparatus for monitoring whether a cable is coupled to a port of a computer network, said apparatus comprising:

an oscillator generating an oscillator signal at a first frequency;

a frequency indicator coupled to said oscillator for indicating the frequency of said oscillator signal;

a comparator coupled to said frequency indicator for comparing the indicated frequency of said oscillator signal to a predetermined frequency, said comparator outputting a cable detect signal whose value is dependent on said comparison;

a controller having an input coupled with said comparator to receive said cable detect signal, said controller, responsive to said cable detect signal, coupling said port to a path of said computer network.

7. The apparatus of claim 6, wherein said first frequency is approximately 1.4 MHz.

8. The apparatus of claim 7, wherein said frequency indicator determines the frequency rate of said oscillator signal and said predetermined frequency is approximately 1.2 MHz.

9. The apparatus of claim 6 further comprising a filter coupled to said port for filtering differential mode signals output from said port.

10. The apparatus of claim 6 further comprising a plurality of diodes coupled to said oscillator to provide surge protection.

11. The apparatus of claim 6 further comprising a plurality of resistors coupled to said oscillator to provide hysteresis.

12. The apparatus of claim 6, wherein said oscillator is comprised of a line receiver.

13. The apparatus of claim 6 wherein said frequency indicator is coupled to said cable through said oscillator.

14. The apparatus of claim 6 wherein a wire of the cable is coupled to the oscillator.

15. An apparatus for monitoring whether a cable is coupled to a port of a computer network, said apparatus comprising:

an oscillator generating an oscillator signal;

a rate detector coupled to said cable for generating a cable detect signal having a value dependent on the frequency of said oscillator signal;

a controller having an input coupled with said comparator receive said cable detect signal, said controller, responsive to said cable detect signal, coupling said port to a path of said computer network.

16. The apparatus of claim 15, wherein said rate detector also determines whether a received signal is valid.

17. The apparatus of claim 15, wherein said first frequency is approximately 1.4 MHz.

18. The apparatus of claim 17, wherein said predetermined frequency is approximately 1.2 MHz.

19. The apparatus of claim 15 further comprising a filter coupled to said port for filtering differential mode signals output from said port.

20. The apparatus of claim 15 further comprising a plurality of diodes coupled to said oscillator to provide surge protection.

21. The apparatus of claim 15 further comprising a plurality of resistors coupled to said oscillator to provide hysteresis.

22. The apparatus of claim 15, wherein said oscillator is comprised of a line receiver.

23. The apparatus of claim 15, wherein said cable is comprised of shielded twisted pair wiring or unshielded twisted pair wiring.

24. The apparatus of claim 23, wherein said computer network is comprised of a token ring.

25. The apparatus of claim 23 wherein a wire of the cable is coupled to the oscillator.

26. The apparatus of claim 23 wherein the oscillator signal is coupled to two wires of the twisted pair cable as a common mode signal.

27. The apparatus of claim 15, wherein said cable has a length of at least 7 feet.

28. An apparatus for reconfiguring a computer network responsive to whether a twisted-pair cable is coupled to a port of the network comprising:

a) an oscillator generating an oscillator signal at a first frequency;

b) a connector by which a twisted-pair cable may be attached; said connector having an A contact and a B contact;

c) a differential line receiver having an A input and a B input and at least one output, the A input of the line receiver being coupled to the A contact of the computer and the B input of the line receiver being coupled to the B contact of the connector, the differential line receiver used to receive data from a computer system;

d) a frequency measurement circuit monitoring the frequency of the oscillator signal, the frequency measurement circuit generating a cable detect signal whenever the oscillator is oscillating at the second frequency;

e) a controller having an input coupled to the frequency measurement circuit to receive said cable detect signal, the controller, responsive to said cable detect signal, coupling the port of the computer network.

29. The apparatus of claim 28 wherein a wire of the cable is coupled to the oscillator.

30. The apparatus of claim 28 wherein the oscillator signal is coupled to two wires of the twisted pair cable as a common mode signal.

31. An apparatus for reconfiguring a computer network responsive to whether a twisted-pair cable is coupled to a port of the network comprising:

a) an oscillator generating an oscillator signal at a first frequency;

b) a connector by which a twisted-pair cable may be attached, said connector having an A contact and a B contact;

c) a differential line drive having an A output and a B output and at least one output, the A output of the line drive being coupled to the A contact of the connector and the B input of the line drive being coupled to the B contact of the connector, the differential line driver used to send data to a computer system;

d) frequency measurement circuit monitoring the frequency of the oscillator signal, the frequency measurement circuit generating a cable detect signal whenever the oscillator is oscillating at the second frequency;

e) a controller having an input coupled to the frequency measurement means to receive said cable detect signal, the controller, responsive to said cable detect signal coupling the port of the computer network.

32. The apparatus of claim 28 wherein a wire of the cable is coupled to the oscillator.

33. The apparatus of claim 31 wherein the oscillator signal is coupled to two wires of the twisted pair cable as a common mode signal.

* * * * *